United States Patent [19]
Hegenstaller et al.

[11] Patent Number: 4,611,979
[45] Date of Patent: Sep. 16, 1986

[54] PROCESS AND APPARATUS FOR EXTRUSION OF COMPOSITE STRUCTURAL MEMBERS

[75] Inventors: Anton Hegenstaller, Mühlenstrasse 9, D-8891 Unterbernbach; Xaver Spies, Kühbach/Unterbernbach, both of Fed. Rep. of Germany

[73] Assignee: Anton Hegenstaller, Unterbernbach, Fed. Rep. of Germany

[21] Appl. No.: 764,846

[22] Filed: Sep. 10, 1985

Related U.S. Application Data

[62] Division of Ser. No. 684,013, Dec. 20, 1984.

[30] Foreign Application Priority Data

Dec. 22, 1983 [DE] Fed. Rep. of Germany ....... 3346469

[51] Int. Cl.[4] .............................................. B29C 47/54
[52] U.S. Cl. ................................ 425/376 R; 425/406; 425/438; 425/441; 425/444
[58] Field of Search ................... 425/376 R, 406, 443, 425/444, 456, 258, 438

[56] References Cited

U.S. PATENT DOCUMENTS

| | | | |
|---|---|---|---|
| 2,256,361 | 9/1941 | Straub | 264/71 |
| 4,107,378 | 8/1978 | Bourguignon et al. | 264/118 |
| 4,263,239 | 4/1981 | Dunbar et al. | 264/118 |
| 4,284,595 | 8/1981 | Peters et al. | 264/109 |
| 4,358,418 | 11/1982 | Heggenstaller | 264/108 |
| 4,432,916 | 2/1984 | Logan | 264/108 |
| 4,505,797 | 3/1985 | Richter | 264/108 |

FOREIGN PATENT DOCUMENTS

| | | | |
|---|---|---|---|
| 0649288 | 9/1962 | Canada | 264/108 |
| 1247002 | 8/1967 | Fed. Rep. of Germany . | |
| 2743873 | 4/1979 | Fed. Rep. of Germany | 264/120 |
| 2926087 | 1/1981 | Fed. Rep. of Germany . | |
| 2933593 | 3/1981 | Fed. Rep. of Germany | 264/109 |
| 2948082 | 6/1981 | Fed. Rep. of Germany | 264/171 |
| 0816285 | 7/1959 | United Kingdom | 264/109 |
| 2071560 | 9/1981 | United Kingdom | 264/109 |

*Primary Examiner*—Willard E. Hoag
*Attorney, Agent, or Firm*—Karl F. Ross; Herbert Dubno

[57] ABSTRACT

Apparatus, for extrusion of a mixture of wood particles and binder, including a compression chamber, in an extrusion press, for precompressing the mixture by a compression stroke transverse to the extrusion axis, the compression stroke being delivered by at least one precompression piston, wherein the improvement comprises mixing the mixture prior to precompression with elongated bits which will be acted on by an orienting influence in a known way so that the elongated bits are deposited substantially parallel to the extrusion axis, and performing the precompression of the outer layers of the mixture with a reduced precompression ratio so that the bits oriented prior to precompression remain fixed in position during the subsequent extrusion stroke. Preferably the elongated bits in the mixture are oriented by free fall of the mixture through a plurality of upright, thin-walled bars of approximately equal height positioned above the compression chamber during filling of the extrusion apparatus by a mechanical hopper moving to and fro over the bars continuously. The bars may be vibrated and the hopper moved intermittently instead of continuously as an alternative.

11 Claims, 10 Drawing Figures

PROCESS AND APPARATUS FOR EXTRUSION OF COMPOSITE STRUCTURAL MEMBERS

This application is a division of application Ser. No. 684,013 filed Dec. 20 1984.

FIELD OF THE INVENTION

Our present invention relates to a process and apparatus for extrusion of a hardened composite structural member, i.e. a member composed of vegetable bits, chiefly wood chips, with a binder, particularly a weather-resistant binder, using a piston extruder, particularly a piston extruder in which a mixture is filled into a compression chamber and the mixture is precompressed by a compression stroke transverse to the extrusion axis, the compression stroke being delivered preferably by two precompression pistons, the compression chamber being connected to a heatable output channel for the extrudate product.

BACKGROUND OF THE INVENTION

For the production of particleboard, chipboard and structural members of various shapes, it is known inter alia to extrude a hardenable composition consisting of the vegetable-matter (usually wood) particles with a hardenable binder (usually a thermosetting resin with water-resistant properties such as a phenol-formaldehyde, melamine, resorcinol resin) using an extrusion press. In the extruder channel, heaters may cause setting or hardening of the extruded composition which, upon emergence from the extruder, can be cut to desired lengths.

The particular type of extrusion process which is involved in this invention originates from the work described in the German patent document-printed application DE-AS No. 12 47 002, in which efforts were made to align the bits or particles included in the extrudate in a particular direction by the extrusion process.

For this purpose a mixture was first precompressed in a first compression process by a vertically operating precompression piston with considerable compression force in a compression channel and then compressed in a second compression process by a horizontally operating extruder piston.

When one practices these teachings, one can determine that the bits assume an orientation which is parallel to the upper surface near the upper surface, as has been long known from the nature of the pressing process by the extruder press plate.

However in the core of the extrudate a random distribution of particles exists, particularly when thick-walled extruded material is manufactured. Moreover it has been erroneously assumed heretofore that for an increase of the stiffness of the extrudate material, a considerable compression of the mixture must be provided in the precompression process. The more intensive is the compression in the precompression process however, the less of a binding is experienced by the separately precompressed increments of the extrudate product pressed against one another in the extruder in the extrusion direction. Indeed tests have shown that products formed by this process art process can be comparatively easily broken along the binding surfaces of the individual parts or layers and no useful value with respect to the stiffness and strength is attained.

OBJECTS OF THE INVENTION

It is the principal object of the invention to extend the principles set forth in the aforementioned publication so that an effective increase of the strength of the extrudate product results in the extrusion direction, and at the same time the binding of the individual extrudate parts or layers is greatly intensified, so the danger of breaking along binding zones no longer exists.

Another object of our invention is to provide an improved process which produces strong extrudate boards and other structural shapes with diminished specific weight and weather-resistant properties, which can be installed as the inner or outer walls of a building or as structural or supporting members thereof with appropriate strength and solidity.

It is an object of this invention, moreover, to provide an improved process for making an extrudate product comprising a mixture of vegetable bits in a binder which has an improved breaking strength for lengthwise stresses, while also an improved binding strength between the extrudate parts.

It is still another object of this invention to provide an apparatus for making an improved extrudate product formed from a mixture of vegetable bits with a binder, particularly a mixture of wood chips with a weather resistant binder, which has an improved binding strength between the extrudate parts as well as an increased breaking strength lengthwise between increments of the extruded strand.

SUMMARY OF THE INVENTION

These objects and others which will become apparent hereinafter are attained in accordance with the invention in a process and apparatus for extrusion of vegetable bits, chiefly wood chips, with a binder, particularly a weather resistant binder such as one of those mentioned, in a piston extruder, especially a piston extruder in which the mixture is filled into a compression chamber and the mixture is precompressed by a precompression stroke transverse to the extrusion axis, the precompression stroke being delivered by two pistons, the compression chamber being connected to a heatable output channel for hardening the extrudate product.

This invention is based on our discovery that, when the elongate particles are oriented parallel to the extrusion direction at opposite sides of the mass and zones are precompressed at these opposite sides the finished extrudate product's different layers are bonded together excellently and the product is devoid of the drawbacks enumerated above. Particularly it is important that the elongated chips therein at least in the outer layers of the extrudate product should have an overwhelmingly parallel orientation to the extrusion direction.

This invention not only succeeds in providing an excellent extrudate finished product in which the elongated chips in the extrudate lie approximately parallel to the upper surfaces of the extrudate product, but the solidity of the extrudate product is better than prior art products because these elongated chips or bits are aligned parallel to one another and the direction of extrusion.

This chip or bit orientation can not be achieved by mere precompression of the mixture. Additionally it is required that at least the longer elongated chips or bits of the mixture particles should be preoriented during filling of the compression chamber of the extrusion press. The compression ratio in the precompression will be selected so that the oriented positions of the bits are held fixed in the extrusion process. Suitable precompression ratios lie between 1:1.5 and 1:2.5, preferably about 1:2, corresponding to a compression of 1.5 to 2.5 volumes of the mixture into one volume at the surface zones.

The preorientation of the bits or chips is accomplished during filling of the compression chamber at least in part by free fall of the mixture through a chute having a plurality of upright (on-edge), equally spaced, parallel thin-walled bars or blades positioned above and below the compression chamber and spaced laterally from one another.

Surprisingly simply filling the compression chamber by pouring the mixture from the chute through the bars from a mechanical hopper which moves laterally over the chute in a continuous to and fro oscillating motion can achieve the desired particle orientation in zones of the filling within and proximal to the parallel-blade grates. Alternatively the hopper may be moved intermittently across the chute and the bars vibrated at a high frequency by, for example, an electromagnet to achieve the same chip or bit orientation parallel to the extrusion axis.

This method of bit orientation has been taught in part in German patent DE-OS No. 29 26 087, in which the compression molding with wood chips is described. However, the bars used in this prior art method of compression molding engage each other in a toothlike manner and have different heights to prevent them from vibrating.

In the present invention the bars are locally fixed and are all of equal height i.e. on the same level as to their upper and lower edges.

Further the bars are positioned in two separate arrays, one above, the other below the compression chamber and are arranged with greater spacing from each other than those of the prior art.

The next important step is the precompression. This precompression is effected by pressing from above and below the compression chamber through the respective blade grates.

During the precompression process the precompression pistons must accordingly penetrate among the bars arranged in the chutes and are shaped to do so. At the same time the compression stroke of this precompression is limited by the height of the bars. Only a limited precompression of the outlying layers by each extruder piston, which is essentially smaller than that taught in German patent DE-AS No. 12 47 002, is allowed in the process of the invention.

With the foregoing precompression however, the prerequisites will be created for binding the individual extruded portions or layers to one another extraordinarily tightly. Without the precompression this proves troublesome.

The process can indeed be provided for a vertical as well as a horizontal extruder or extrusion piston press. Furthermore a slantingly directed extrusion process can also be improved by the method of the invention. However a horizontal extruder is preferable and is the best mode set forth herein.

It is remarkable that with the blade grates of the invention one can vary the lengthwise orientation of the bits and chips in a definite way. Thus it is possible according to this invention to orient the bits or chips lengthwise in the outer layers of the extrudate product, while leaving those in the core more or less interlocked and matted. It is however preferable to produce the desired lengthwise orientation of bits and chips throughout the entire extrudate product. This is particularly important when the extrusion product has canals formed therein. By this chip orientation process an amazingly improved strength in the region of the canal can result. The canal wall is compressed so as to be dense in a barklike or husklike manner and lengthwise orientation of the particles in the surface zone defining each passage strengthens the product between the canals.

Unexpected as these improvements in strength around the canals are, a minimum space must remain between the canals. An optimum spacing for the canals is achieved when the distance between the edges of adjacent canals equals or is greater than the canal radius.

Moreover the invention teaches the movability of the upper precompression piston lengthwise from a position covering the feed entrance of the chute and the bars therein along the extrusion axis so that the compression chamber may be filled through the chute.

Experience shows that part of the mixture has a tendency to accumulate on the top of the blade grate in free fall through the chute. A wiper, according to the invention, movable lengthwise to or transverse to the bars is provided by which that portion of the mixture accumulating on the bars is brushed off to fall into the compression chamber. Thus a proper orientation is achieved for that part of the bits and chips in that portion of the mixture.

According to a feature of the invention, the precompression from opposite sides of the zones of the mass after the particles have been oriented parallel to the extrusion direction, is effected over increments of length of over 200 mm and preferably from 400 to 600 mm. Moreover the extrusion piston reciprocated in this direction to compact each increment against the previously compacted increment which is undergoing hardening by heating, is cooled according to another feature of the invention. During the stroke of this piston, friction resisting displacement of the strand can be relieved at least over part of the length of the hardening passage.

BRIEF DESCRIPTION OF THE DRAWING

The above and other objects, features and advantages of our invention will become more readily apparent from the following description, reference being made to the accompanying drawing highly diagrammatic in which.

SPECIFIC DESCRIPTION

Figure 1:
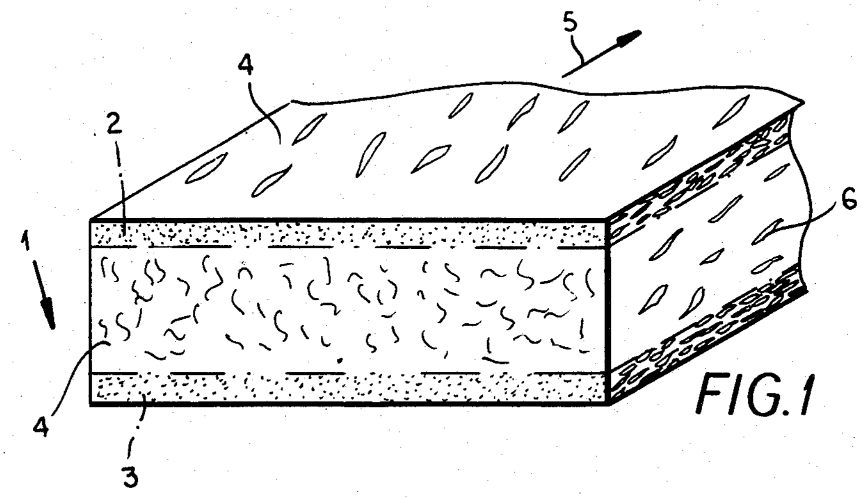
FIG. 1 is a perspective partial view of the extrudate product having several layers.

An extruded product 1, a board which can have a considerable thickness, for example 8.5 cm, is shown in FIG. 1. It can be used in an interior wall of a building, a supporting panel or the like. The invention also does not preclude thin-walled extruder products similar to those manufactured in the process described below.

The manufactured product 1 has along the extrusion direction 5 a typical layered structure which is produced by the extrusion process. The upper covering layer 2 and the lower covering layer 3 are precompressed against the core layer 4.

It is of vital significance that at least in the covering layer 2 and the covering layer 3 especially the bits or chips are oriented as can be seen from the bits or particles 6 indicated in FIG. 1 which are parallel or nearly parallel to the extrusion axis 5.

The mixture of vegetable particles, particularly wood bits or chips, are extruded with a binder, wherein the particles include a substantial proportion of elongated chips.

Figure 2:
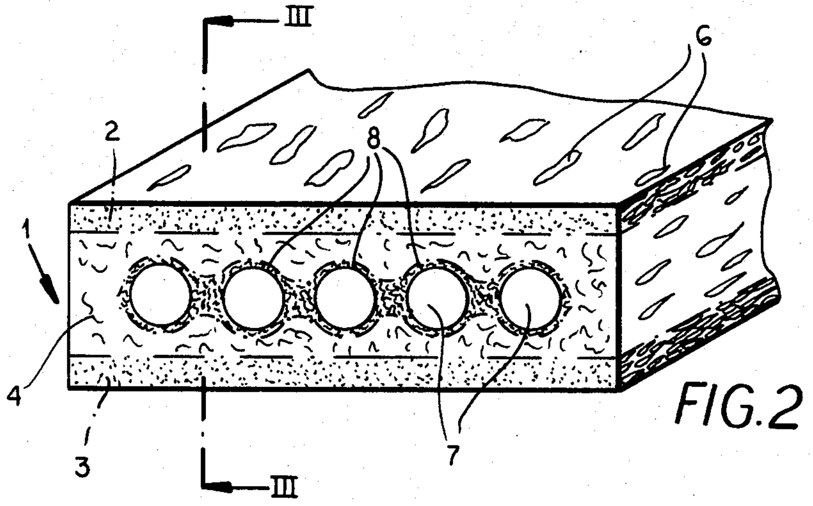
FIG. 2 is a partial perspective view similar to FIG. 1 in which the extruded board is shown with canals therein.

In FIG. 2 is shown a variant of the extruder product 1, which has parallel canals running lengthwise therethrough. The canal wall layer 8 has on its sides a stronger compression or higher density than the core layer 4. As can be seen from FIG. 3, if the extruder material of FIG. 2 is cut along the sectional plane III—III, the elongated chips or the bits 6 seen in FIG. 3 on the exposed surface resulting from the sectioning are according to this invention likewise oriented parallel to the extrusion axis 5.

The product of FIG. 2 with the channels 7 is formed by pressing the mass around respective bars running through the piston which is reciprocated in the direction of the bars.

Figure 3:
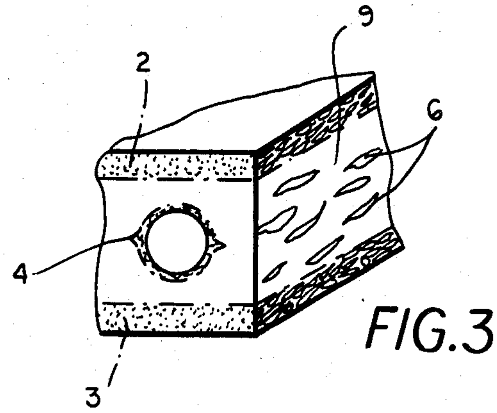
FIG. 3 is a partial cutaway view of the extruded product of FIG. 2 sectioned along the plane indicated by III—III in FIG. 2.
Figure 9:
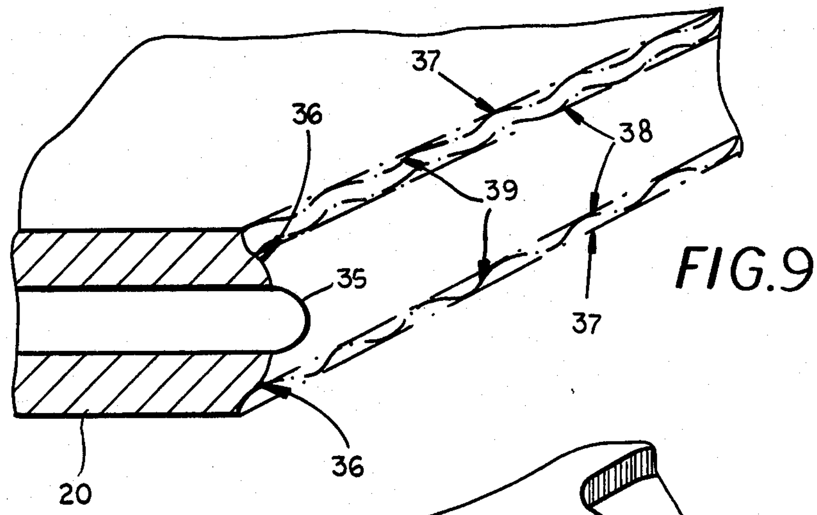
FIGS. 9 and 10 are partial perspective views of two embodiments of extruder pistons of this invention.
Figure 10:
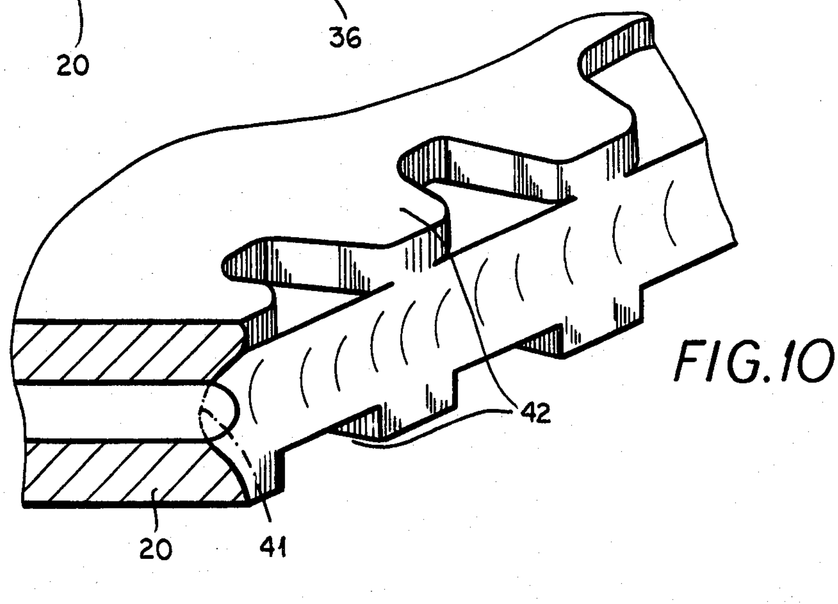

FIGS. 1 to 3 show therefore the products of the subsequently described extrusion process. Accordingly in the apparatus of FIGS. 4 to 6 the products will be produced from a compression chamber 10, which is circumscribed or defined by the precompression piston contour 12 of the usual extruder piston. The extruder pistons 20 are shown in FIGS. 9 and 10 corresponding to the extruded products 1 of FIGS. 1 and 2, particularly having a rectangular cross section. The lower precompression piston 16 is fed between the compression chamber walls 11 which are perpendicular to the plane of the drawing.

A plurality of bars 13 are positioned and arranged at the upper and lower sides of the compression piston contour 12 so as to have a known spacing from one another, for example 8 mm. Advantageously these bars are thin-walled, upright and in this embodiment of equal height. Because the bars are subject to wear, a suitable steel sawblade band material is recommended for use in the comblike bar structure. Between the upper bars 13 the mixture in the mechanical hopper 14 finds access to the compression chamber 10 by free fall through the bars 13.

Figure 4:
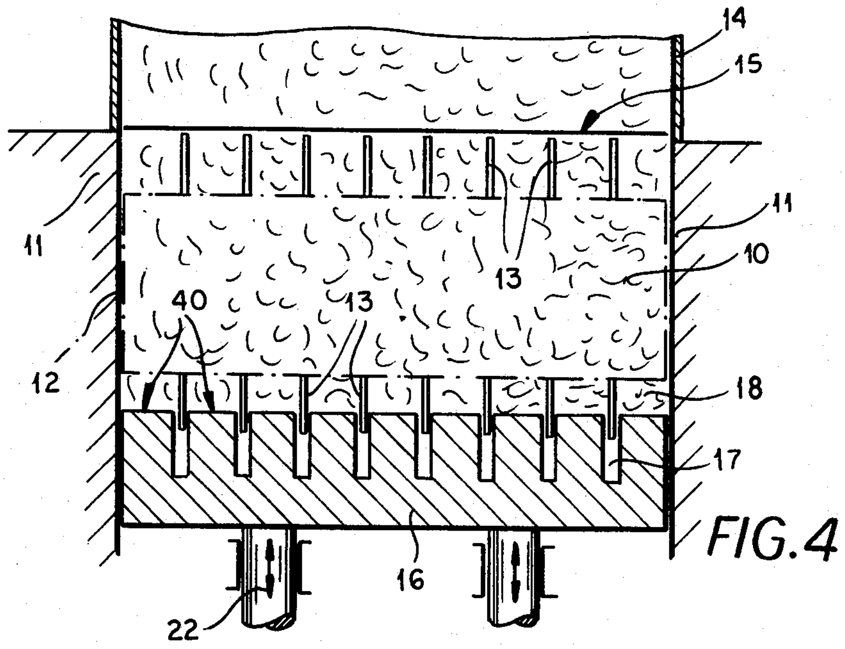
FIG. 4 is a cross sectional view of an embodiment of the novel extruder of the invention showing the compression chamber of the extruder (seen perpendicular to the extrusion direction)
Figure 5:
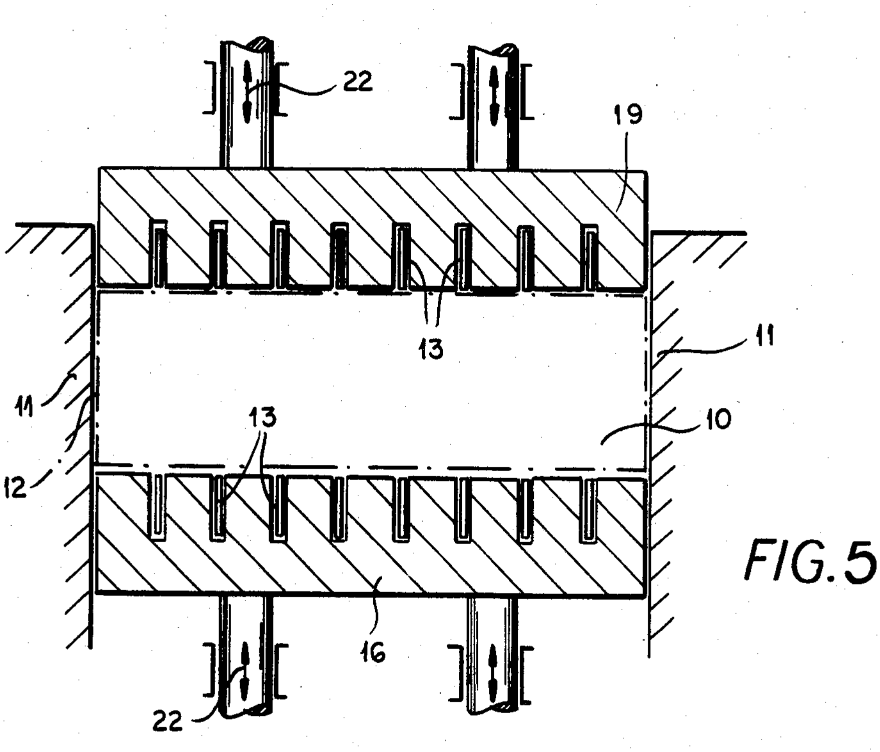
FIG. 5 is a cross sectional view of the embodiment according to FIG. 4 with the precompression pistons of the extruder in their final compressing positions.
Figure 6:
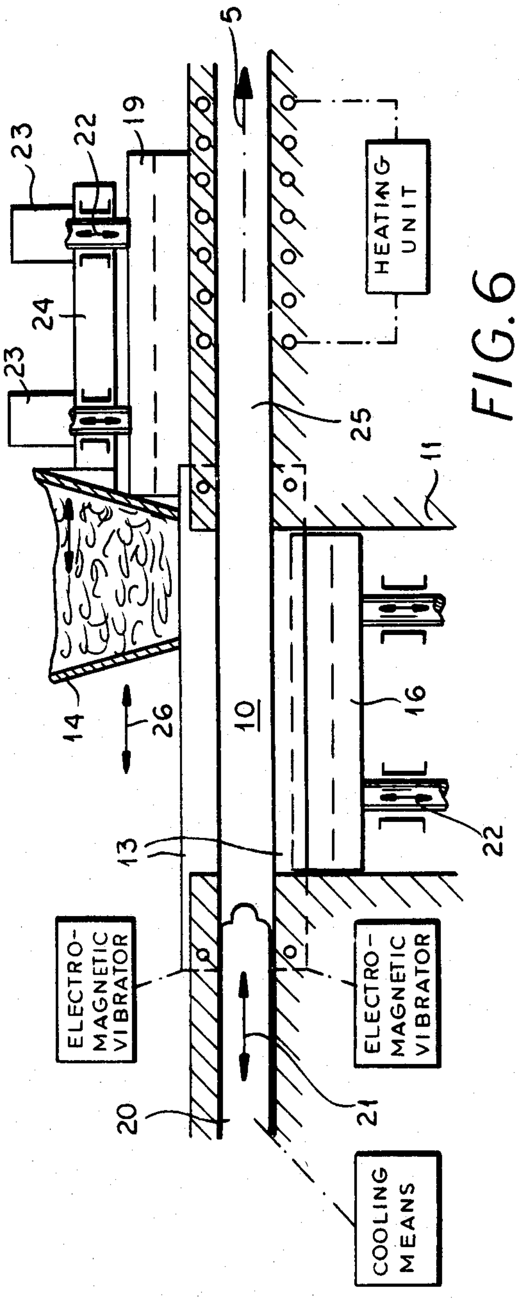
FIG. 6 is a schematic lengthwise cross sectional view through the novel piston extruder apparatus of this invention.
Figure 7:
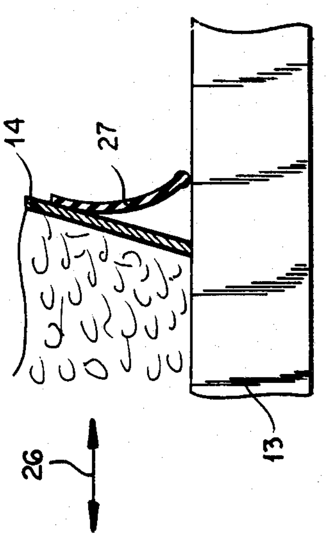
FIG. 7 is a partial lengthwise cross sectional view through the novel extruder apparatus similar to FIG. 6 but showing the details of a mechanical feed hopper with a wiper attached thereto.

In the chute 18 between the walls 11 in the preferred embodiment the projecting pronglike edge of the compression piston 16 is movable upwardly and downwardly according to the arrows 22 of FIGS. 4 to 6 between the lower bars 13. The free front pressing surfaces 40 of the precompression pistons 16 and 19 are coplanar but spaced from each other. The bars 13 engage with play in the apertures or slots 17 in the precompression pistons 16 and 19.

The bars 13 have the function of aligning the vegetable bits in the mixture in the mechanical hopper 14 so that they, as shown in FIGS. 1 and 2, acquire an overwhelmingly parallel orientation 6 to the extrusion axis 5. This orientation 6 will be favored when the mechanical hopper 14, as is shown in FIG. 6, is moved to and fro over the bars 13 which are below the feed entrance opening 15. The lower edge of the mechanical hopper 14 can be positioned over the upper bars 13. In this case it is expected that a small portion of the mixture settles on bridges on the upper edge of the bars 13. So that the mixture will accumulate reliably and with an even distribution in the compression chamber 10 at least one wiper 27 is arranged or positioned on the oscillating mechanical hopper 14, which because of the hopper 14 oscillatory motion likewise aids in the orientation of vegetable bits in the mixture lengthwise to the extrusion axis 5. The wiper 27 is attached to the hopper 14 and conformed to assist in the delivery of mixture from the hopper 14 to the compression chamber 10.

As soon as the compression chamber 10 is filled, the upper precompression piston 19 will be brought to a covering position over the upper bars 13 by a lengthwise shift parallel to the extrusion axis 5, the covering position corresponding to and opposing the position of the lower precompression piston 16. During precompression the upper precompression piston 19 moves downwardly through the chute 18 while the lower precompression piston 16 moves upwardly. Both pistons 16 and 19 are provided with the vertical disposed slots 17 therein which engage the bars 13 as both pistons reach their final precompression position as shown in FIG. 5. This precompressing of the covering layers 2 and 3 should proceed only to an extent sufficient to secure a binding of the individual extrudate layers or parts prior to the final extrusion press stroke. An optimal compression ratio for this precompression is found to be $\frac{1}{2}$. As a result of this precompression lengthwise oriented bits are fixed in position and remain in this position during the compression stroke.

In FIG. 6 a schematic vertical lengthwise cross section through the extrusion apparatus is shown. The extruder piston 20 is movable to and fro in the direction of arrows 21 horizontally. The precompression pistons 16 and 19 are movable in a vertical direction as shown by the arrows 22 in FIGS. 5 and 6. Advantageously an extrusion technique as reported in German patent DE-PS No. 29 32 406 may be employed.

A reinforced channel 25 is connected to the compression chamber 10 and directed along the extrusion axis 5. This output channel 25 is advantageously constructed according to methods described in German patents DE-PS No. 25 35 989 and DE-PS No. 27 14 256.

Above the bars 13 the mechanical hopper 14 may be moved to and fro in the direction indicated by the arrows 26. For this purpose mechanical hopper 14 is attached to slide rail 24 also carrying upper precompression piston 19. This precompression piston 19 dips a predetermined distance into the chute 18 between the bars 13 (confer with FIG. 4). The to and fro motion of the slide bar 24 is an additional function besides acting to equalize the accumulation of the input mixture in the compression chamber 10. As soon as the compression chamber 10 is filled with the mixture, the slide bar 24 moves into a position, in which the upper precompression piston 19 comes into coincidence with the lower precompression stroke 16. On the slide bar 24 stroke implements 23 are positioned which move the upper precompression piston 19 into the final position shown in FIG. 5 in the direction of arrow 22. Both precompression pistons 16 and 19 remain in their shown position in FIG. 5 until extrusion of the product by an extrusion stroke of the extrusion piston 20.

It is obvious that a variety of operations to obtain a product with lengthwise directed chips or bits are possible with the extrusion apparatus shown in FIGS. 4 to 6. For example a continuous to and fro motion of the upright mechanical hopper 14 according to the direction shown by the arrows 26 is recommended. However, when one only wants the covering layers 2 and 3 provided with the preferred lengthwise orientation 6 in which the bits point in a particular direction, but the bits or chips in the core region are allowed to be deposited in a matted or interlocking configuration, then it is recommended that during the filling of the chute 18 not in the compression chamber 10, the continuous to and fro motion of the hopper 13 referred to above be used, whereas for the filling of the compression chamber structure 10 a greatly slowed down motion for the hopper 14 be used. In the latter case the bits or chips will fall more or less independently.

Other variants of the foregoing filling methods are apparent. One can for example construct the mechanical hopper 14 so that it covers the entire capacity of the compression chamber 10 when filled. It is then conceivable to put the bars 13 into oscillation with a small amplitude but a high frequency. This oscillation of the bars 13 will produce the desired orientation 6 of the bits and chips parallel to the extrusion axis 5 without moving the hopper 14 to and fro as shown in FIG. 6. It is possible to provide such an oscillatory action by connecting the bars 13 to an oscillating magnet 13 for example. A similar result would be obtained if the bars remain fixed while the mechanical hopper 14 is joggled in an oscillatory fashion at various places along the extrusion axis 5.

The precompression by pistons 16 and 19 could not occur without the slots or apertures 17 in the layerlike structure of the operating extruder chamber. The press pressure distributes itself more or less uniformly along the coplanar bandlike press surfaces 40. A finished extrudate product 1 develops therefore with bandlike or shaded areas although this causes no defect or weakness. If one does not cover the extrudate product 1 or plan to as is done with a veneer, a slight abrasion (sanding or planing) of the upper surface suffices to produce a uniform surface appearance.

Figure 8:
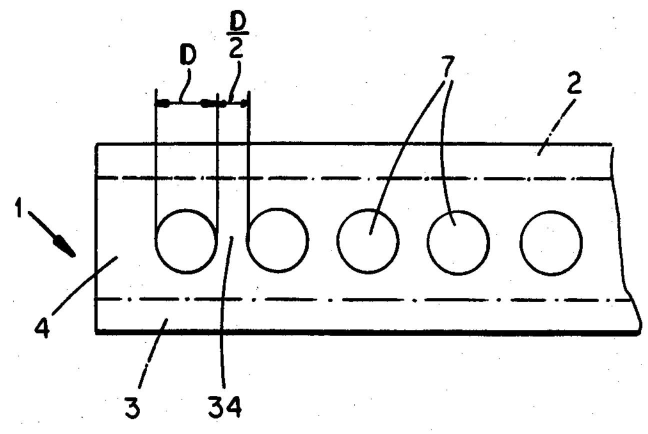
FIG. 8 is a cross sectional view of an extrudate product shown schematically with dimensions.

When one produces an extrudate product 1 according to the structure of FIG. 2, the spacing of the canals 7 is important for the strength and other properties of the material. The prior art extrudate product has a clearance of between one to five times the radius of the canals 7. In contrast the invention here has sought to reduce the minimum allowed spacing. In FIG. 8 a spacing corresponding to half the diameter of the canals 7 is taught. The optimum spacing is slightly greater than the spacing of FIG. 8, but it has also been found that the spacing can be substantially under this value. An optimal canal wall layer 8 results when the dimensions of the extrudate product 1 are chosen to be the same as those set forth in FIG. 8. As shown in FIG. 3, on the other hand, the bridge 34 has a considerable portion of bits or chips in the orientation 6 parallel to the extrusion axis 5.

The smaller the dimensions shown in FIG. 8, the more difficult it is for the bits and chips to fall evenly between the bars 13 into the compression chamber 10 and attain their proper orientation. In order to prevent defects then, the lower precompression piston 16 with its lower bars 13 will be moved to and fro transverse to the extrusion axis 5, whereby a more even distribution of the mixture in the lower compression chamber will be brought about.

Finally two embodiments of the extruder piston 20 are shown in FIGS. 9 and 10. From the German patent DE-AS No. 12 47 002 it is known that the front surface of the extruder piston is concave. Instead of this FIG. 9 teaches a front surface of an extruder piston with a convex protruding surface, more particularly in the extruder piston has the front profile 35 protruding convex and two somewhat outwardly directed intermediate profiles 36 all of which are smoothly melded into one another continuously. In contrast to the prior art teaching the front edges are provided with wave-shaped variations 39 between the flight lines 37 and 38, which has the advantage that the indentation in which the extruded products engage one another results without really changing the orientation 6 of the bits or chips.

In FIG. 10 a concave curvature 41 of the front surface of extruder piston 20 is shown which is blended into two wavelike front edges 42. These front edges 42 are preferably nearly sawtoothed but rounded off.

In both cases it is recommended to cool the extruder piston to prevent a tentative binding of various particles lying on the extruded material.

The front profile of the extruder piston can be constructed with a ridge profile or a molding-like profile which will be attached to the piston body proper. This has proved advantageous because such a piston head or molding promotes a stable engagement of the extrudate pieces pressed to one another.

We claim:

1. In an apparatus comprising a piston extruder press in which an extrudate product is formed in a compression chamber by a precompression of a mixture of vegetable bits and a binder, said mixture being precompressed in said compression chamber by an upper precompression piston movable down toward said extrusion axis and a lower precompression piston movable upward toward said extrusion axis, and said compression chamber being provided with an output channel, directed along the extrusion direction, through which said extrudate product is forced by an extruder piston from said compression chamber subsequent to compression, the improvement wherein a plurality of upright, substantially equal, thin-walled bars are arranged locally fixed spaced from each other along a first plane parallel to said extrusion axis above said compression chamber and along a second plane parallel to said extrusion axis below said compression chamber, said precompression pistons being movable toward said extrusion axis so as to engage among said bars limitedly and stopped at a plane corresponding to the contour of the extruder piston of said extrusion press said precompression pistons having recesses for receiving said bars.

2. In an apparatus according to claim 1, the improvement wherein said precompression pistons have a plurality of vertical slots between the coplanar pressing surfaces of said precompression pistons, said slots being positioned in said pressing surfaces so that said precompression pistons may advance and engage said bars in said compression chamber.

3. In an apparatus according to claim 1, the improvement wherein said upper precompression piston is movable along a direction parallel to said extrusion axis from a released position uncovering said feed entrance opening of said compression chamber to a covering position in which said precompression piston is positioned over said opening for precompression and the like.

4. In an apparatus according to claim 1, the improvement wherein that said bars are provided with a movable wiper acting to dislodge that portion of said mixture accumulating on said bars during filling.

5. In an apparatus according to claim 1, the improvement wherein a central front surface of said extruder piston which engages said extrudate has a convex profile and the front edges of said extruder piston are shaped like a wave transverse to said extrusion axis.

6. In an apparatus according to claim 5, the improvement wherein said wave-shaped edges transverse to said extrusion axis are substantially sawtoothed.

7. In an apparatus according to claim 1, the improvement wherein the central front surface of said extruder piston which engages said extrudate has a concave profile and the front edges of said extruder piston are wave-shaped.

8. In an apparatus according to claim 1, the improvement wherein said lower precompression piston and said bars which engage said lower precompression piston are movable transverse to said extrusion axis to and fro during filling.

9. In an apparatus according to claim 1, the improvement wherein said bars are provided with a means for vibration.

10. In an apparatus according to claim 9, the improvement wherein said means for vibration is an electromagnet.

11. In an apparatus according to claim 1, the improvement wherein said compression chamber is provided with a plurality of rods lying in a plane parallel to said extrusion axis for forming canals in said extrudate, said rods are substantially cylindrical and the spacing between said rods corresponds substantially to the radius of said rods.

* * * * *

UNITED STATES PATENT AND TRADEMARK OFFICE

CERTIFICATE OF CORRECTION

PATENT NO. : 4,611,979

DATED : September 16, 1986

INVENTOR(S) : Anton HEGGENSTALLER et al

It is certified that error appears in the above-identified patent and that said Letters Patent is hereby corrected as shown below:

Item [75] First Inventor's name is to read:

--Anton HEGGENSTALLER --.

Item [73] Assignee's name is to read:

--Anton HEGGENSTALLER --.

Signed and Sealed this

Twenty-fourth Day of March, 1987

*Attest:*

DONALD J. QUIGG

*Attesting Officer* *Commissioner of Patents and Trademarks*